(12) United States Patent
Wood (10) Patent No.: US 9,356,737 B2
(45) Date of Patent: May 31, 2016

(54) RETRY BUFFER AND METHOD OF PERFORMING RETRY OPERATION USING RETRY BUFFER

(71) Applicant: Keysight Technologies, Inc., Minneapolis, MN (US)

(72) Inventor: Glenn Wood, Colorado Springs, CO (US)

(73) Assignee: Keysight Technologies, Inc., Santa Rosa, CA (US)

( * ) Notice: Subject to any disclaimer, the term of this patent is extended or adjusted under 35 U.S.C. 154(b) by 97 days.

(21) Appl. No.: 14/225,691

(22) Filed: Mar. 26, 2014

(65) Prior Publication Data

US 2015/0280865 A1    Oct. 1, 2015

(51) Int. Cl.
*H04L 1/18*    (2006.01)
*H04L 1/08*    (2006.01)

(52) U.S. Cl.
CPC ............... *H04L 1/08* (2013.01); *H04L 1/1809* (2013.01); *H04L 1/1812* (2013.01); *H04L 1/1874* (2013.01)

(58) Field of Classification Search
CPC .......... H04L 1/08; H04L 1/1812; H04L 1/819
See application file for complete search history.

(56) References Cited

U.S. PATENT DOCUMENTS

| | | | | |
|---|---|---|---|---|
| 6,404,739 B1 * | 6/2002 | Gonno | .................. | H04L 1/1809 370/236 |
| 6,543,014 B1 * | 4/2003 | Okuyama | ............... | H04L 45/20 370/412 |
| 6,658,235 B1 * | 12/2003 | Tolmunen | ............. | H04L 1/0009 455/226.1 |
| 6,665,807 B1 * | 12/2003 | Kondo | ................ | G06F 13/4059 370/236 |
| 7,269,774 B2 * | 9/2007 | Sudo | ..................... | H04L 1/0021 714/704 |
| 7,653,060 B2 * | 1/2010 | Mayhew | ............... | H04L 1/1838 370/392 |

OTHER PUBLICATIONS

"Hybrid Memory Cube", Hybrid Memory Cube Consortium, 2012, pp. 1-121.

* cited by examiner

*Primary Examiner* — Esaw Abraham (57) ABSTRACT

A method is provided for transmitting packets of a packet stream in real-time. The method includes sequentially writing packets in a retry buffer of a transmitting agent, the retry buffer including multiple contexts; sequentially transmitting the packets written in the retry buffer to a receiving agent, while continuing to sequentially write additional packets the retry buffer; receiving acknowledgements from the receiving agent when the receiving agent has successfully received the transmitted packets, while continuing to sequentially transmit the packets written in the retry buffer to the receive agent; receiving a retry request from the receiving agent when the receiving agent has not successfully received a transmitted packet; and retransmitting packets from the retry buffer to the receiving agent beginning with the transmitted packet not successfully received by the receiving agent, which resulted in the retry request, while continuing to sequentially write additional packets received from the transmitting agent in the retry buffer.

20 Claims, 6 Drawing Sheets

RETRY BUFFER AND METHOD OF PERFORMING RETRY OPERATION USING RETRY BUFFER

BACKGROUND

Generally, conventional high speed serial data transmission protocols support some form of "retry" operation, according to which packets (e.g., data packets) sent by a transmitting agent (e.g., host device) that are incorrectly or unsuccessfully received by a receiving agent (e.g., memory device) can be retransmitted upon request. The unsuccessful receipt of packets may be determined, for example, based on high bit error rates. A retry operation involves the receiving agent unsuccessfully receiving packets from the transmitting agent on a forward link of a bus, and then sending information to the transmitting agent, usually on a return link, identifying the packets that need to be retransmitted. To enable a retry operation, a retry buffer is provided to temporarily store transmitted packets until it is confirmed by the receiving agent that the packets have been received successfully (i.e., thus requiring no retry operation). At this point, the buffered transmitted packets may be disregarded and overwritten, if necessary. Otherwise, when the receiving agent does not confirm that the packets have been received successfully, the retry operation is initiated, resulting in retransmission of buffered packets from the last point of known successful transmission.

Some transmission protocols, such as Hybrid Memory Cube (HMC) protocol, communicate information identifying the packets that need to be retransmitted using a pointer exchange operation. For example, the HMC protocol provides packets consisting of 128-bit flow units, each of which is referred to as a "FLIT" ("FLow unIT"). A retry pointer is transmitted with each packet to represent the packet's position within in the retry buffer. Retry pointers may include a forward retry pointer (FRP) that travels in the forward direction on a forward link with each packet, and a reverse retry pointer (RRP), which is the same retry pointer traveling in the reverse direction on a reverse link (e.g., the other side of the forward link), thereby completing a round trip. The retry buffer is addressed using FLIT addresses, and the retry pointers represent corresponding packet positions in the retry buffer. For example, each packet transmitted by the transmitting agent contains an 8-bit FRP field that indicates the address at which the packet is stored inside the retry buffer. Likewise, each packet returned from the receiving agent to the transmitting agent contains an 8-bit RRP field that indicates the value of the latest successfully received FRP. The transmitting agent may therefore learn which packets have been successfully received by the receiving agent by looking at the RRP fields on the returned packets. The RRP is the same retry pointer traveling back on the reverse the link, completing the round trip. More details of the HMC protocol are described, for example, by Hybrid Memory Cube Consortium, "Hybrid Memory Cube" (2012), the entire contents of which are hereby incorporated by reference.

However, a limitation of using a pointer exchange-based protocol is that allowable space in the retry buffer is limited by the space that the retry pointers have been sized to address. Accordingly, there is a need to expand the retry buffer space to avoid such limitation. Further, in the event the incoming packets are to be streamed in real-time, the buffering of the packets must continue even while attempting to execute a retry operation (retransmitting packets that have already been sent). Under these circumstances, conventional systems generally require suspending the incoming (real-time) packet stream or dropping some of the packets of the incoming packet stream to accommodate the retry operation.

Implementation of two buffers with two separate memories may address these issues, where one buffer acts as the retry buffer and the other buffer (located upstream of the retry buffer) is simply a first-in first-out (FIFO) buffer. However, each chip memory has associated overhead (e.g., BIST circuitry), so architecture effectively has twice the overhead and twice the chip area.

SUMMARY

In a representative embodiment, a method is provided for transmitting packets of a packet stream in real-time. The method includes sequentially writing packets in a retry buffer of a transmitting agent, the retry buffer comprising a plurality of contexts; sequentially transmitting the packets written in the retry buffer to a receiving agent, while continuing to sequentially write additional packets the retry buffer; receiving acknowledgements from the receiving agent when the receiving agent has successfully received the transmitted packets, while continuing to sequentially transmit the packets written in the retry buffer to the receive agent; receiving a retry request from the receiving agent when the receiving agent has not successfully received a transmitted packet; and retransmitting packets from the retry buffer to the receiving agent beginning with the transmitted packet not successfully received by the receiving agent, which resulted in the retry request, while continuing to sequentially write additional packets received from the transmitting agent in the retry buffer.

In another representative embodiment, a method is provided for transmitting packets to a receiving agent. The method includes sequentially writing packets of a packet stream in a retry buffer in real-time, and tracking the writing of the packets by advancing a write pointer in the retry buffer; sequentially transmitting the packets written in the retry buffer to the receiving agent, and tracking the transmitting of the packets by advancing a playback pointer; receiving information acknowledging successful receptions of the transmitted packets by the receiving agent, and tracking the successful receptions by advancing a read pointer; receiving a retry request when the transmitted packets are not successfully received by the receiving agent; relocating the playback pointer to a current location of the read pointer in response to the retry request; and initiating a retry operation in response to the retry request by sequentially retransmitting packets written in the retry buffer to the receiving agent beginning at the relocated playback pointer, and tracking the retransmitting of the packets by advancing the playback pointer. The wherein packets of the packet stream continue to be written in the retry buffer in real-time and tracked by the write pointer during the retry operation.

In another representative embodiment, a transmitting agent is provided for transmitting packets to a receiving agent via a bus. The transmitting agent includes a transaction layer and a retry buffer. The transaction layer is configured to issue packets to be transmitted to the receiving agent. The retry buffer is configured to sequentially receive and store the packets from a transaction layer of the transmitting agent in real-time; sequentially transmit the stored packets to the receiving agent via a forward link of the bus, where stored packets not yet transmitted are buffered packets; receive acknowledgements from the receiving agent when the receiving agent has successfully received the transmitted packets, where transmitted packets for which acknowledgements have not yet been received are pending packets; sequentially retransmit the pending packets to the receiving agent, beginning with a transmitted packet not successfully received by the receiving agent; and continue to sequentially receive and store the packets from the transaction layer of the transmitting agent in real-time while sequentially retransmitting the pending packets.

BRIEF DESCRIPTION OF THE DRAWINGS

The representative embodiments are best understood from the following detailed description when read with the accompanying drawing figures. Wherever applicable and practical, like reference numerals refer to like elements.

DETAILED DESCRIPTION

In the following detailed description, for purposes of explanation and not limitation, illustrative embodiments disclosing specific details are set forth in order to provide a thorough understanding of embodiments according to the present teachings. However, it will be apparent to one having had the benefit of the present disclosure that other embodiments according to the present teachings that depart from the specific details disclosed herein remain within the scope of the appended claims. Moreover, descriptions of well-known devices and methods may be omitted so as not to obscure the description of the example embodiments. Such methods and devices are within the scope of the present teachings.

Generally, it is understood that as used in the specification and appended claims, the terms "a", "an" and "the" include both singular and plural referents, unless the context clearly dictates otherwise. Thus, for example, "a device" includes one device and plural devices.

As used in the specification and appended claims, and in addition to their ordinary meanings, the terms "substantial" or "substantially" mean to within acceptable limits or degree. For example, "substantially cancelled" means that one skilled in the art would consider the cancellation to be acceptable. As a further example, "substantially removed" means that one skilled in the art would consider the removal to be acceptable.

As used in the specification and the appended claims and in addition to its ordinary meaning, the term "approximately" means to within an acceptable limit or amount to one having ordinary skill in the art. For example, "approximately the same" means that one of ordinary skill in the art would consider the items being compared to be the same.

Generally a retry buffer temporarily stores packets from an incoming packet stream being transmitted from a transmitting agent to a receiving agent for potential retransmission if a link error occurs or the receiving agent otherwise fail to successfully receive the transmitted packet. According to various embodiments, the retry buffer relies on a write pointer, a playback pointer, and read pointer to track the status of the stored packets. The write pointer is advanced for each incoming packets being stored. The playback pointer is advanced with each outgoing packet transmitted to the receiving agent, and the read pointer is advanced with acknowledgement of successful receipt of a transmitted packet.

According to the HMC protocol mentioned above, for example, each packet (e.g., data packet) transmitted by the transmitting agent contains an 8-bit FRP field indicating the address (write pointer) at which the packet is stored inside the retry buffer, and each packet returned from the receiving agent contains an 8-bit RRP field indicating the value of the latest successfully received FRP (read pointer). However, incorporation of an 8-bit pointer field in each packet limits addressable space to only 256 units, which is defined as one "context." That is, a conventional retry buffer space is limited to 256 units. Further, in the case of the HMC protocol, in particular, since the 256 units are FLITs rather than packets, and each packet typically consists of multiple (an integer number of) FLITs. Therefore, since most packets are multi-FLIT packets, substantially fewer than 256 packets may be stored in the 256 units. For example, if each packet is 9 FLITs long, then a single context retry buffer limited to 256 units is able to store only 28 packets (of 9 FLITs each). Thus, as RRPs are received, the read pointer will rotate around the retry buffer address space lagging the write pointer, which will eventually wrap around the retry buffer address space and may overtake pending packet that have not yet received acknowledgement of successful FRP reception, resulting in interruption of the flow of the packet stream.

Generally, various representative embodiments of the invention address this issue by implementing a single, expanded retry buffer incorporating multiple contexts (and is thus larger than a conventional retry buffer having one context of 256 units, for example). In the embodiment, each context of the retry buffer is no larger than the addressable packet space (e.g., no larger than 256 FLITs in the above example). However, at any given time, multiple contexts of the retry buffer may be active, so that the full benefit of the expanded retry buffer may be utilized for storing "buffered" packets in the event a large number retry operations are being executed.

Figure 1:
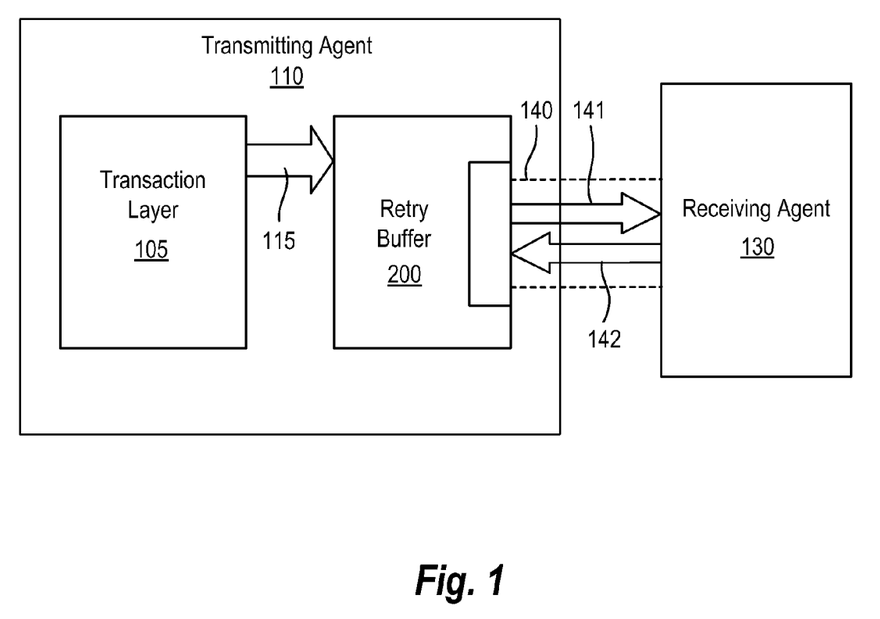
FIG. 1 is a simplified block diagram of a data communication system, according to a representative embodiment.

FIG. 1 is a simplified block diagram of a data communication system, according to a representative embodiment.

Referring to FIG. 1, data communication system 100 includes a transmitting agent 110, a receiving agent 130 and a bus 140. The transmitting agent 110 includes a transaction layer 105 that generates an incoming packet stream of transaction layer packets (packet streams), a transmission path 115, and a retry buffer 200, which is implemented as a buffer memory that buffers transmission of the packets to the receiving agent 130 via the bus 140, as well as manages retry operations. For example, the retry buffer 200 tracks the successful reception of the packets by the receiving agent 130 (which may be referred to as successful packets), and retries transmission of any packets that have not been acknowledged as having been successfully received (which may be referred to as unsuccessful packets), along with any packet subsequently transmitted to the receiving agent after transmitting the unsuccessful packet but before receiving indication of the unsuccessful receipt, as discussed below. The bus 140 has a forward link 141 for transmitting the packets from the retry buffer 200 to the receiving agent 130, and a return link 142 of transmitting information regarding the success or failure of the packet from the receiving agent 130 to the retry buffer 200. For example, an acknowledgement receiving on the return link 142 may be used to indicate successful receipt of a corresponding packet.

Figure 2:
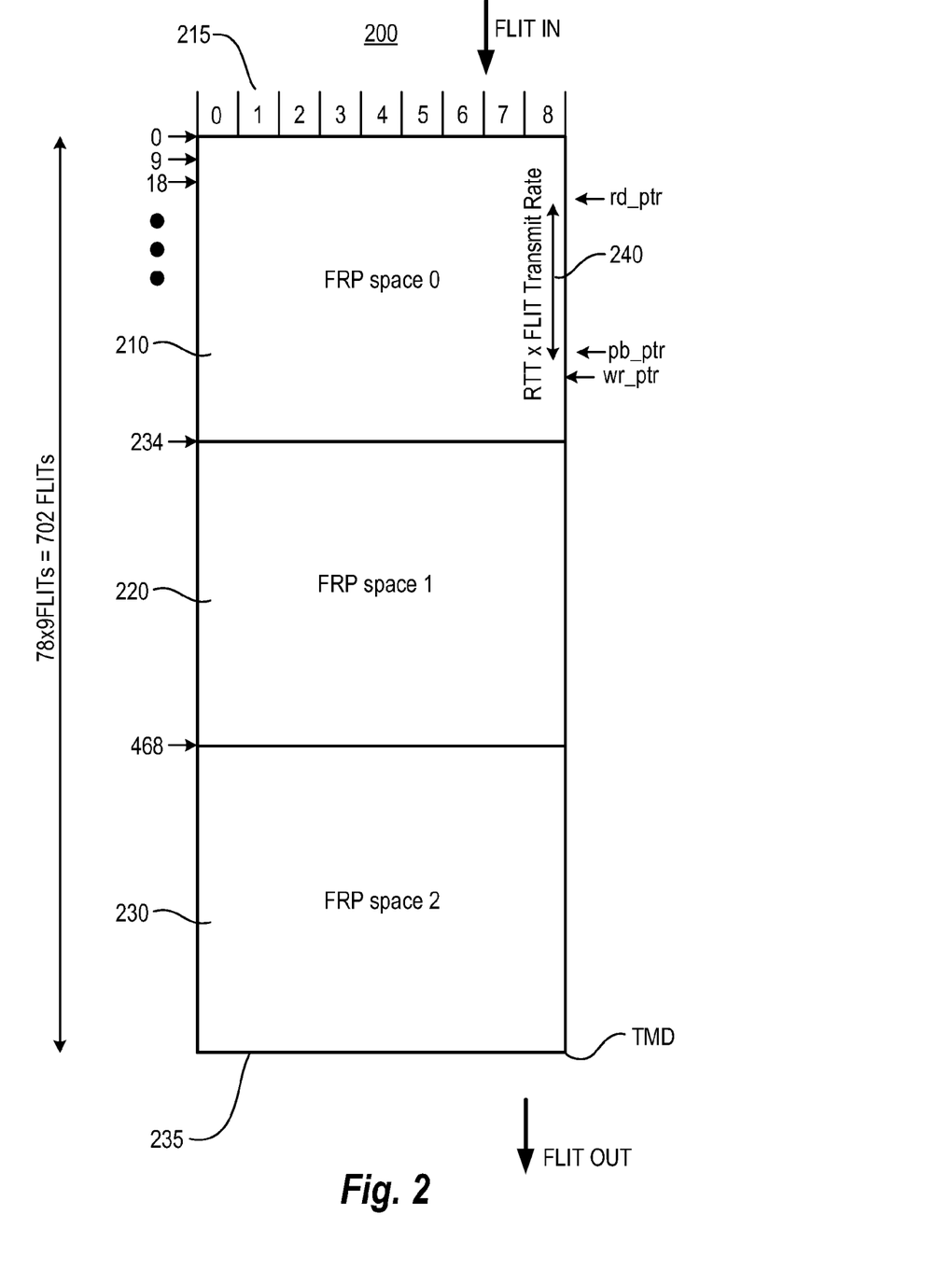
FIG. 2 is a simplified block diagram of a retry buffer of the data communication system and illustrative pointers before execution of a retry operation, according to a representative embodiment.
Figure 3:
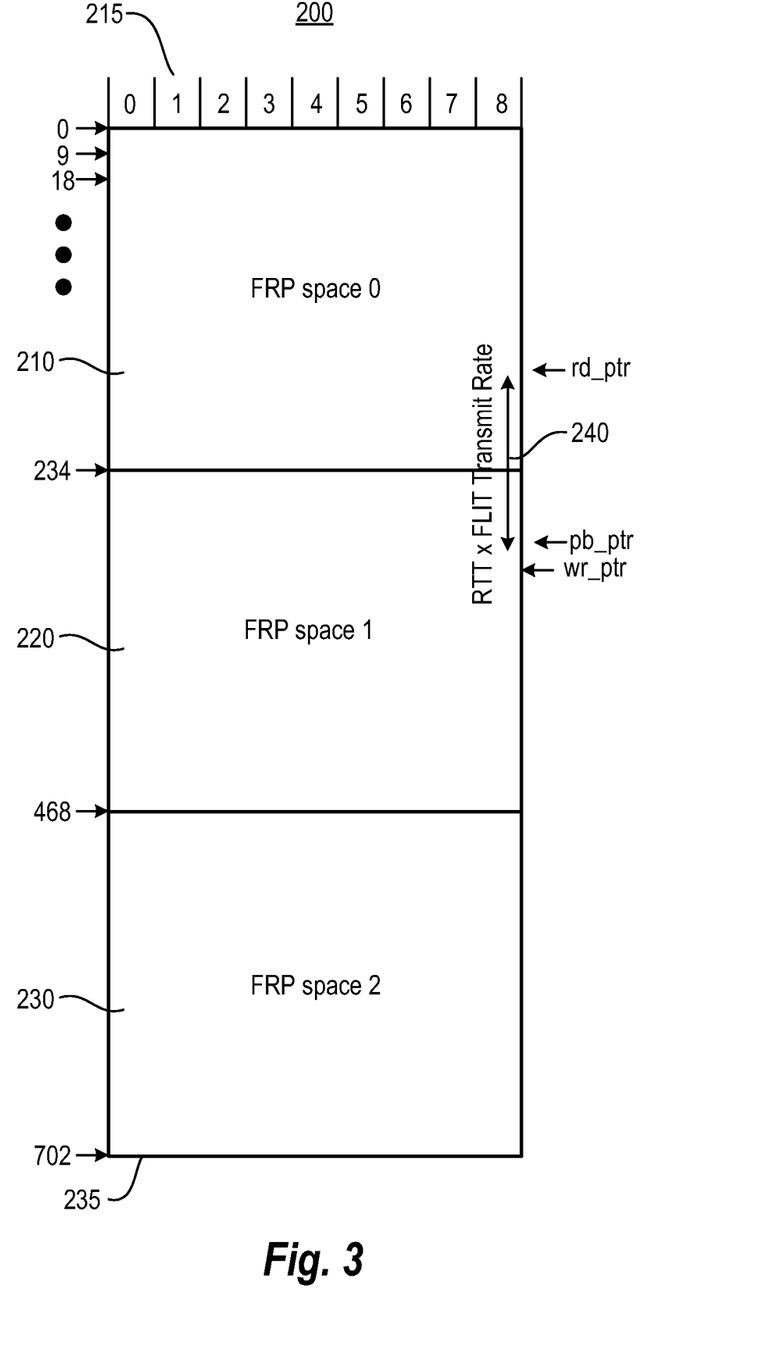
FIG. 3 is a simplified block diagram of a retry buffer of the data communication system and illustrative pointers before execution of a retry operation, according to a representative embodiment.

FIGS. 2 and 3 are block diagrams of a retry buffer of the data communication system and illustrative pointers before execution of a retry operation, according to a representative embodiment.

Referring to FIGS. 2 and 3, retry buffer 200 includes multiple contexts, indicated by representative first context 210 (FRP space 0), second context 220 (FRP space 1), and third context 230 (FRP space 2). The first to third contexts 210-230 may be referenced to as FRP spaces 0 to 2, respectively, because although a single context is addressable by the 8-bit FRP (address) field discussed above, a multi-context full buffer, such as the retry buffer 200, is not addressable by the 8-bit FRP field due to the larger number of addresses. That is, each of the first to third contexts 210-230 of the retry buffer 200 is limited to be no larger than the addressable space, which is 256 FLITs. In the present example, however, the addressable space is limited to 234 FLITs of each of the first to third contexts 210 to 230, for purposes of illustration. Also, in the present example, each packet is assumed to be nine FLITs long (e.g., FLITs 0 to 8 indicated in the top row of the retry buffer 200), and each context thus contains 26 packets. Accordingly, the first context 210 includes FLITs 0 to 233, the second context 220 includes FLITs 234 to 468, and the third context 230 includes FLITs 468 to 701. Therefore, the retry buffer 200 is configured to store up to 78 packets of 9 FLITs each, or a total of 702 FLITs. The packets enter 9-FLIT wide read port 215 at the first context 210 and exit 9-FLIT wide write port 235 at the third context 230.

Of course, the various embodiments are not limited in the size of contexts and/or packets, as shown in the example depicted in FIGS. 2 and 3. For instance, the addressable space of each of the first to third contexts 210 to 230 may be limited to 243 FLITs, in which case each context would contain 27 packets containing 9 FLITs each. Or, the addressable space of each of the first to third contexts 210 to 230 may be limited to 252 FLITs, in which case each context would contain 28 packets contain 9 FLITs each. Similarly, packets may include a different number of FLITs (e.g., 1 FLIT long, 2 FLITs long, etc.), without departing from the scope of the present teachings. Notably, as supported packet mix expands, the efficiency of the Retry Buffer 200 may begin to be reduced, e.g., due to the presence of empty locations, sometimes.

Generally, at any given time, packets are residing in rows of the retry buffer 200 may be classified as "buffered," "pending," or "retired." Buffered packets are packets that have been written in the retry buffer 200 and are awaiting transmission to the receiving agent 130. Pending packets are packets that have been transmitted by the transmitting agent 110, but have not yet been acknowledged as having been successfully received by the receiving agent 130. Retired packets are packets for which acknowledgment of successful reception has been received. Retired packets may be eventually over-written as the retry buffer cycles to the beginning after new packets have been written in the last row of the third context 230.

FIGS. 2 and 3 also depict representative pointers used for implementing buffering and retry operations. Write pointer wr_ptr points to a row in which a most recent new packet (e.g., comprising nine FLITs) from the incoming packet stream is deposited or stored, e.g., in real-time. After the retry buffer 200 receives and stores the incoming packet, the write pointer wr_ptr advances upwards, modulo the total memory depth TMD, which is the depicted example is modulo 702. That is, wr_ptr advances upwards incrementally (incrementally increased) until it reaches TMD-1 (e.g., 701), and then rolls over to row 0 in the first context 210 and begins the advancing sequence again. Thus, packets are sequentially written in the retry buffer 200 to through the last context (e.g., the third context 230), and then wrap-around to being sequentially written to the initial context (e.g., the first context 210).

Playback pointer pb_ptr points to a row of the retry buffer 200 from which the corresponding previously stored packet is to be transmitted to the receiving agent 130 via the forward link 141 of the bus 140. Tokens, used for managing the transmission process must be spent on the new packets being transmitted in response to the playback pointer pb_ptr. Any packets in the retry buffer 200 between the write pointer wr_ptr and the playback pointer pb_ptr are deemed "buffered," as discussed above. In the absence of a retry operation, the playback pointer pb_ptr advances upwards with every transmitted packet, modulo the TMD, as discussed above, and effectively remains one row behind the write pointer wr_ptr.

Read pointer rd_ptr points to a row of the retry buffer 200 storing a packet having the latest (most recent) acknowledgement that it was successfully received by the receiving agent 130. That is, the read pointer rd_ptr points to the row containing the most recent successful packet. Thus, any packets located between the read pointer rd_ptr and the playback pointer pb_ptr are deemed "pending," and packets preceding the read pointer rd_ptr are deemed "retired," as discussed above. The success of the transmission and ensuing advancement of the read pointer rd_ptr may be based on observing the 8-bit RRP fields.

In the example shown in FIG. 2, each of the write pointer wr_ptr, the pb_ptr, and the read pointer rd_ptr points to a row within the first context 210. The write pointer wr_ptr will advance incrementally through rows of the second and third contexts 220 and 230 as new packets of the incoming packet stream arrive (in real-time), and ultimately the write pointer wr_ptr will wrap-around to the first row of the first context 210. For instance, in FIG. 3, the write pointer wr_ptr has advanced to the next consecutive context (second context 220), and now points to a row within the second context 220. Likewise, the playback pointer pb_ptr will advance incrementally through rows of the second and third contexts 220 and 230 as stored packets are transmitted, and ultimately the playback pointer pb_ptr will wrap-around to the first row of the first context 210. Again, in FIG. 3, the playback pointer pb_ptr has also advanced to the next consecutive context (second context 220), while the read pointer rd_ptr is still in the first context 210. It is understood that the write pointer wr_ptr, the playback point pb_ptr and/or the read pointer rd_ptr may be located in the same or different contexts, depending on the particular operational state.

In comparison, a conventional retry buffer will wrap-around to the first row after writing to the last row of just one context. Therefore, when successful receipt of a packet of the first row has not yet been acknowledged by a receiving device (i.e., the packet has not yet been retired), the new packets can no longer buffered until an appropriate acknowledgement is received, freeing the first row (and subsequent rows) at the beginning of the context. In this case, real-time writing of data does not occur. That is, the packet flow to the transmitting agent 110 will stop, interrupting real-time transmission.

Referring again to FIG. 2, arrow 240 indicates the space between the playback pointer pb_ptr and the read pointer rd_ptr, which in the depicted example is determined by the product of the round trip time (RTT) and the FLIT transmit rate (i.e., RTT×FLIT transmit rate). The RTT is the time between transmitting a packet and receiving a corresponding acknowledgement, and the FLIT transmit rate is the rate at which the retry buffer 200 transmits to the receiving agent 130 via the forward link 141 of the bus 140. The FLIT transmit rate may also be referred to as the link level transmit rate. The space indicated by the arrow 240 also encompasses the rows of pending packets, discussed above. Notably, there will not be multiple FRPs of the same value outstanding as long as the product of the RTT and the FLIT transmit rate is less than 234 FLITs, in the depicted example.

Figure 4:
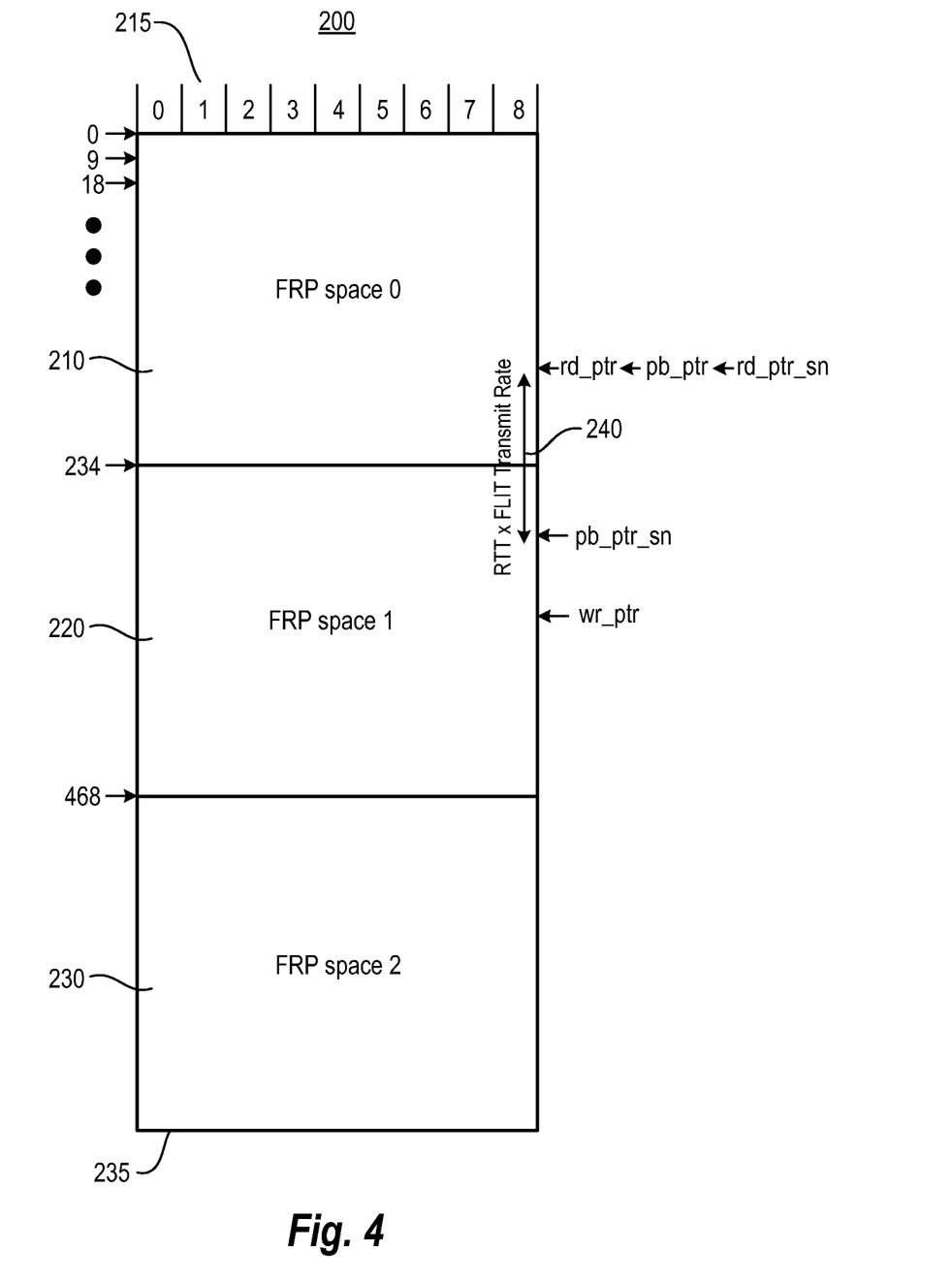
FIG. 4 is a simplified block diagram of a retry buffer of the data communication system and illustrative pointers at the start of a retry operation, according to a representative embodiment.
Figure 5:
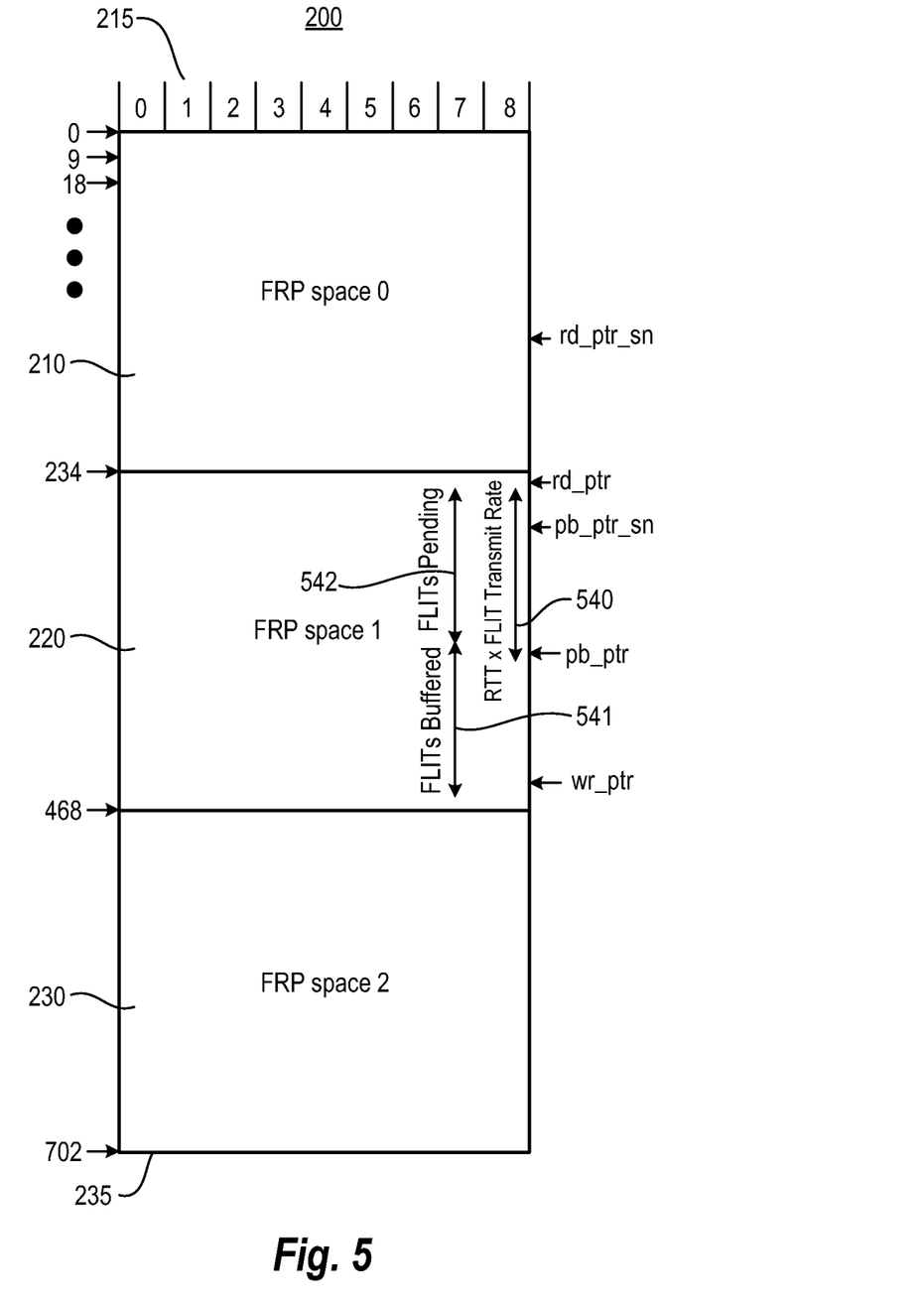
FIG. 5 is a simplified block diagram of a retry buffer of the data communication system and illustrative pointers in the midst of a retry operation, according to a representative embodiment.

As mentioned above, in the absence of a retry operation, the playback pointer pb_ptr advances upwards with every transmitted packet, modulo the TMD, and therefore effectively remains one row behind the write pointer wr_ptr. However, when a retry operation begins, the playback pointer pb_ptr is reset back to the location of the read pointer rd_ptr before being allowed to advance again. FIGS. 4 and 5 are block diagrams of a retry buffer of the data communication system, showing a sequence of steps for implementing a retry operation, according to a representative embodiment.

Referring to FIG. 4, depicting the start of a retry operation, it is assumed for purposes of illustration that a retry operation has been initiated in response to a retry request, e.g., initiated by the receiving agent 130 and received by the retry buffer 200 as the last received valid RRP residing in the retry request packets. In this event, the current location of the playback pointer pb_ptr is marked by playback pointer snapshot pb_ptr_sn, indicating the current playback location, and the current location of the read pointer rd_ptr is marked by read pointer snapshot rd_ptr_sn, indicating the current read location, in order to mark the respective locations at the time the retry operation is requested. The playback pointer pb_ptr is reset back to the location of the read pointer rd_ptr (and the corresponding read point snapshot rd_ptr_sn).

Meanwhile, the retry buffer 200 continues to receive and store the real-time incoming packet stream, and the write pointer wr_ptr continues to advance, accordingly. Also, after being relocated, the playback pointer pb_ptr again begins to advance with every transmitted packet, modulo the TMD, beginning at the new location of the playback pointer pb_ptr. This results in incrementally re-transmitting the packets between the read pointer snapshot rd_ptr_sn and playback pointer snapshot pb_ptr_sn, and receiving corresponding acknowledgements, which in turn advances the read pointer rd_ptr.

As can be seen in FIG. 4, the playback pointer pb_ptr now significantly lags the write pointer wr_ptr. However, the playback pointer pb_ptr advances more quickly than the write pointer wr_ptr, in part because the playback pointer pb_ptr is allowed to run at the link level transmit rate while the write pointer wr_ptr runs at the FLIT issue rate, which is at least incrementally slower than the link level transmit rate. The FLIT issue rate may also be referred to as the transaction layer issue rate. In addition, since the tokens of the pending packets being re-transmitted have already been spent (during the first transmission), the rate at which the playback pointer pb-ptr advances will not be throttled back by flow control. Of course, once the playback pointer pb-ptr passes the playback pointer snapshot pb_ptr_sn location, flow control will require tokens to be spent on the buffered packets being transmitted (for the first time) in response to the playback pointer pb_ptr. Therefore, the playback pointer pb_ptr eventually is able to catch-up to the write pointer wr_ptr over time, unless there are subsequent retry operations that occur before the playback pointer pb_ptr make significant progress toward the write pointer wr_ptr.

FIG. 5 depicts the retry buffer 200 in the midst of the retry operation (which may be referred to as the "post-replay phase"), as indicated by the fact that the playback pointer pb_ptr has passed the playback pointer snapshot pb_ptr_sn location. After passing the playback pointer snapshot pb_ptr_sn location, the playback pointer pb_ptr once again points to the row of the retry buffer 200 from which a buffered packet is to be transmitted to the receiving agent 130. This may be referred to as the post-replay phase. Notably, the read pointer rd_ptr also has advanced, pointing to the row of the retry buffer 200 storing a packet having the latest (most recent) acknowledgement that it was successfully received by the receiving agent 130. In FIG. 5, the context base has incremented entirely from first context 210 to second context 220, such that each of the write pointer wr_ptr, the pb_ptr, and the read pointer rd_ptr points to a row within the second context 220. This occurs when the latest returned RRP advances past the row corresponding to FLIT 233 (the highest row in the first context 210), resulting in the read pointer rd_ptr joining the next context (second context 220) at the row containing FLIT 234. In the depicted operational example, the second context 220 also happens to be the same context in which the write pointer wr_ptr and the playback pointer pb-ptr are located. At this point, all of the rows of the first context 210 include retired packets, which may be safely overwritten when write pointer wr_ptr eventually rolls-over to row 0.

As shown in FIG. 5, the playback pointer pb_ptr still has not yet caught-up to the write pointer wr_ptr. The difference is shown by arrow 541, which indicates the buffered packets, as discussed above. The number of FLITs buffered is equal to the product of the RTT and the FLIT issue rate. Meanwhile, the difference between the playback pointer pb_ptr and the read pointer rd_ptr is shown by arrow 542, which indicates the pending packets. As discussed above, the number FLITs pending is equal to the product of the RTT and the FLIT transmit rate (also shown by arrow 540). At this point, if another retry operation is initiated in response to a retry request, the playback pointer pb_ptr will fall further behind the write pointer wr_ptr than it did for the first retry operation, as the space indicated by the arrow 540 is larger than the space indicated by the arrow 240. Indeed, if successive retry operations occur relatively close together, the write pointer wr_ptr may eventually get so far ahead of the playback pointer pb_ptr that it wraps-around and may begin to overwrite pending packets that have not yet been acknowledged (e.g., indicated by the read pointer rd_ptr). In this case, real-time transmission of new packets would need to be interrupted. Otherwise, this would render the retry buffer vulnerable to a corrupted retry operation should one be requested. However, occurrence of either such event is unlikely due to the large size of the retry buffer 200.

In various embodiments, the method of performing retry operations for storing real-time data are effectively governed by protocol or number of basic rules, including rules regarding the write pointer wr_ptr, the playback pointer pb_ptr, the playback pointer snapshot pb_ptr_sn, the read pointer rd_ptr, and the read pointer snapshot rd_ptr_sn, discussed above. More particularly, an illustrative set of such rules may include the following.

First, the write pointer wr_ptr and playback pointer pb_ptr increment in multiples of nine FLITs modulo 702, e.g., as shown in the example depicted by FIG. 2.

Second, the read pointer rd_ptr is equal to the latest returned RRP (an 8-bit quantity) plus a context_base_read, which tracks the context (e.g., one of the first to third contexts 210-230) in which the rd_ptr should be located. The context_base_read may take on values of 0, 234 or 468 in the depicted example.

Third, the RRP can be any number between 0 and 255. However, in accordance with the rules governing the example discussed above, the RRP will only take on values between 0 and 233. An advantage of this range of values is that 234 is a factor of 9, which simplifies the math under the illustrative configuration. Of course, the RRP can be designed to be within other ranges, such as between 0 and 251 (252 being another factor of 9), without departing from the scope of the present teachings. Indeed, the RRP may be a factor of any particular number, although certain values simplify implementation, as would be apparent to one of ordinary skill in the art.

Fourth, the context_base_read, mentioned above, increments between the values 0, 234, 468, and then repeats between the same values by wrapping-around to the first context_base_read value. Referring to the example depicted by FIG. 2, value 0 corresponds to the first row of the first context 210, value 234 corresponds to the first row of the second context 220, and 468 corresponds to the first row of the third context 230.

Fifth, context_base_read increments, e.g., by 234, when the latest returned RRP has wrapped-around past 0. There is logic to detect the wrap-around even in the presence of RRP stream stalls. One caveat is that this logic may fail if the stall between successive RRP returns is greater than half the FRP space of 234 FLITs.

Sixth, upon the start of a Retry of the following operations will happen atomically, as discussed above. The playback pointer pb_ptr is saved in pb_ptr_sn to indicate where the replay needs to end and spending tokens needs to begin again. The read pointer rd_ptr is saved in rd_ptr_sn to indicate where the replay needs to begin. The playback pointer pb_ptr is set to the read pointer rd_ptr to indicate the starting position of the replay operation.

Seventh, as mentioned above, the playback pointer pb_ptr advances at the FLIT transmit rate of the transaction layer link (e.g., 200 Gbps/128=1.5625FLIT/ns), and is therefore faster than the rate at which the write pointer wr_ptr advances, which is the FLIT issue rate. That is, the FLIT issue rate is set by a pacer to be slightly less than the FLIT transmit rate to prevent link overflow.

Eighth, FRP values are stuffed upon reading with the value of the FLIT-granularity playback pointer pb_ptr of the FLIT's position plus one, then modulo 234.

Ninth, since the read port 215 and the write port 235 are each 9 FLITs wide, FLITs are transmitted in 9-FLIT chunks to a scheduler. Unused FLIT positions are set to NULL FLITs (i.e., 0). During replay, if the current read pointer rd_ptr is not a multiple of 9, then logic is present to NULL-out the initial FLITs that should not be retransmitted (because they came before an erroneous packet).

It is understood that the above rules and corresponding interrelations among the various pointers and values are illustrative, and that these rules may vary to provide unique benefits for any particular situation or to meet application specific design requirements of various implementations, without departing from the scope of the present teachings. For example, as mentioned above, the write pointer wr_ptr and playback pointer pb_ptr may increment in multiples of other numbers of FLITs.

Further, although FIGS. 2-5 depict retry buffer 200 as having three contexts, according to various alternative embodiments, a multi-context retry buffer is not limited as to the number of contexts, other than how much memory the designer/user is willing to devote to this functionality. Each context may be between 0 and 255 FLITs long, for example, where the number 255 is based on the general relationship $2^{(pointer\ width)}-1$, where the pointer width refers to the width of the FRP or the RRP. So, applied to the depicted embodiment where the FRP and/or RRP pointer width is 8, the context is $2^8-1=255$. Further, the length of each context should be a multiple of the row width (which is 9 in the depicted example). Otherwise, other pointer rules would be affected.

As a practical matter, zero is a loose lower bound, while the actual lower bound is set by the expected maximum number of FLITS in pending packets. Thus, the set of pending FLITs always spans at most two consecutive contexts (e.g., as shown in FIG. 3).

In contrast, the set of FLITs in buffered packets (i.e., how far the write pointer wr_ptr gets ahead of the playback pointer pb_ptr) may span more than two contexts. A limit is that the write pointer wr_ptr cannot wrap-around to the beginning of the multi-context retry buffer overwrite a space indicated the read pointer rd_ptr, as mentioned above.

Figure 6:
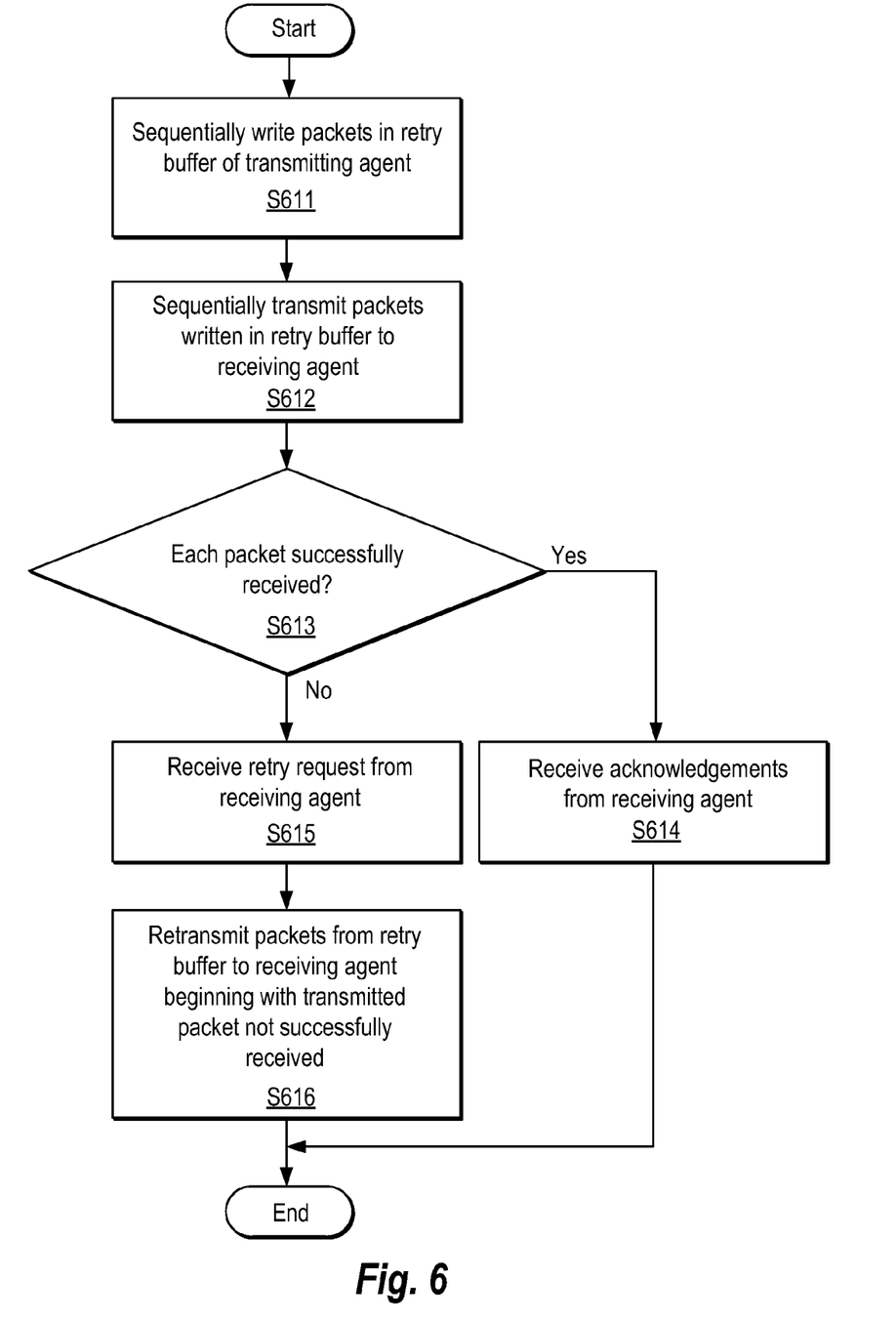
FIG. 6 is a flow diagram showing a method of transmitting packets to a receiving agent in real-time, according to a representative embodiment.

FIG. 6 is a flow diagram showing a method of transmitting packets to a receiving agent in real-time, according to a representative embodiment.

Referring to FIG. 6, packets are sequentially written in a retry buffer (e.g., retry buffer 200) of a transmitting agent (e.g., transmitting agent 110) in block S611. The retry buffer includes multiple contexts (e.g., first to third contexts 210-230). The writing of the packets in the retry buffer may be tracked by setting and advancing a write pointer in the retry buffer. That is, the write pointer is incrementally increased to a next write location in the retry buffer in response to each received packet. The packets may be written in the retry buffer by a transaction layer of the transmitting agent at a FLIT issue rate, for example.

In block S612, the packets in the retry buffer are sequentially transmitted to the receiving agent (e.g., receiving agent 130), while additional packets continue to be sequentially written in the retry buffer. The transmitting of the packets may be tracked by setting and advancing a playback pointer in the retry buffer. That is, the playback pointer is incrementally increased to a next playback location in the retry buffer in response to each packet being transmitted from the retry buffer. The packets may be transmitted to the receiving agent at a link level transmit rate, for example, which is faster than the transaction layer issue rate, as discussed above.

In block S613, it is determined whether each packet has been successfully received by the receiving agent in the order they are transmitted to the receiving agent. When the receiving agent successfully receives the transmitted packets (block S613: Yes), corresponding acknowledgements are received from the receiving agent in block S614, while the packets written in the retry buffer continue to be sequentially transmitted to the receive agent. The successful receptions may be tracked by setting and advancing a read pointer in the retry buffer. That is, the read pointer is incrementally increased to a next read location in the retry buffer in response to each acknowledgement of successful receipt corresponding to a transmitted packet. However, when the receiving agent has not successfully received a transmitted packet (block S613: No), a retry request is received from the receiving agent in block S615. Then, in block S616, pending packets from the retry buffer are retransmitted to the receiving agent, beginning with the transmitted packet not successfully received by the receiving agent (which resulted in the retry request). The retransmitting of the packets may be tracked by resetting the playback pointer to the location of the transmitted packet not successfully received, and advancing the playback pointer with the retransmitted packets. Meanwhile, additional packets continue to be sequentially written in the retry buffer in real-time.

Generally, the ability to support a larger set of buffered packets in a single buffer memory enables real-time streaming applications to have higher reliability (i.e. "uptime") in the presence of bit errors on the link. This is important for high bandwidth, real-time streaming applications that require high uptime. Also, the larger retry buffer tolerates longer RTT latency between transmission of a buffered packet and acknowledgment of the successful receipt of the packet by a receiving agent. Further, the larger memory space provides the ability to use large on-chip memory macros to provide retry buffer storage and retry phase buffering for high bandwidth streaming applications.

One of ordinary skill in the art appreciates that many variations that are in accordance with the present teachings are possible and remain within the scope of the appended claims. These and other variations would become clear to one of ordinary skill in the art after inspection of the specification, drawings and claims herein. The invention therefore is not to be restricted except within the spirit and scope of the appended claims.

What is claimed is:

1. A method of transmitting packets of a packet stream in real-time, the method comprising:
   sequentially writing packets in a retry buffer of a transmitting agent, the retry buffer comprising a plurality of contexts;
   sequentially transmitting the packets written in the retry buffer to a receiving agent, while continuing to sequentially write additional packets in the retry buffer;
   receiving acknowledgements from the receiving agent when the receiving agent has successfully received the transmitted packets, while continuing to sequentially transmit the packets written in the retry buffer to the receiving agent;
   receiving a retry request from the receiving agent when the receiving agent has not successfully received a transmitted packet; and
   retransmitting packets from the retry buffer to the receiving agent beginning with the transmitted packet not successfully received by the receiving agent, which resulted in the retry request, while continuing to sequentially write additional packets in the retry buffer.

2. The method of claim 1, further comprising:
   setting a write pointer to indicate a write location in the retry buffer in which a packet most recently received is being written;
   setting a playback pointer to indicate a playback location in the retry buffer from which a previously stored packet is being transmitted from the retry buffer to the receiving agent; and
   setting a read pointer to indicate a read location in the retry buffer for which a previously transmitted packet for which an acknowledgement of successful receipt by the receiving agent has been received.

3. The method of claim 2, wherein:
   the write pointer is incrementally increased to a next write location in the retry buffer in response to each received packet,
   the playback pointer is incrementally increased to a next playback location in the buffer in response to each packet being transmitted from the retry buffer, and
   the read pointer is incrementally increased to a next read location in the retry buffer in response to each acknowledgement of successful receipt corresponding to a transmitted packet.

4. The method of claim 2, further comprising:
   setting a playback pointer snapshot at the playback pointer indicating a current playback location in the retry buffer in response to the retry request; and
   setting a read pointer snapshot at the read pointer indicating a current read location in the retry buffer in response to the retry request; and
   resetting the playback pointer to the read location indicated by the read pointer,
   wherein retransmitting packets from the retry buffer to the receiving agent begins at the reset playback pointer.

5. The method of claim 4, further comprising:
   sequentially retransmitting the packets from the retry buffer to the receiving agent at a transmission rate that is faster than a receiving rate at which packets received from the transaction layer of the transmitting agent are sequentially written in the retry buffer.

6. The method of claim 5, wherein the faster transmission rate corresponds to a link level transmit rate, and the receiving rate corresponds to a transaction layer issue rate.

7. The method of claim 2, wherein the retry buffer includes buffered packets between the write pointer and the playback pointer, the buffered packets having been written in the retry buffer, but have not yet been transmitted to the receiving agent.

8. The method of claim 2, wherein the retry buffer includes pending packets between the playback pointer and the read pointer, the pending packets having been transmitted from the retry buffer, but not yet acknowledged as successfully received by the receiving agent.

9. The method of claim 2, wherein the retry buffer includes retired packets between a beginning of the retry buffer and the read pointer, the retired packets having been acknowledged as successfully received by the receiving agent.

10. The method of claim 1, wherein continuing to sequentially write the additional packets received from the transmitting agent in the retry buffer comprises sequentially writing the additional packets in a context different than a context from which the packets are being retransmitted.

11. The method of claim 1, wherein sequentially writing packets in the retry buffer comprises wrapping-around from writing packets in a last context to writing packets in an initial context after reaching an end of a last context of the retry buffer.

12. The method of claim 1, wherein each packet comprises a plurality of flow units (FLITs), and each FLIT comprises a plurality of bits.

13. The method of claim 12, wherein each context of the plurality of contexts in the retry buffer comprises a plurality of rows, and each row corresponds to a packet comprising the plurality of FLITs.

14. The method of claim 13, wherein a length of each context is a multiple of a width of a row in the context.

15. A method of transmitting packets to a receiving agent, the method comprising:
   sequentially writing packets of a packet stream in a retry buffer in real-time, and tracking the writing of the packets by advancing a write pointer in the retry buffer;
   sequentially transmitting the packets written in the retry buffer to the receiving agent, and tracking the transmitting of the packets by advancing a playback pointer in the retry buffer;

receiving information acknowledging successful receptions of the transmitted packets by the receiving agent, and tracking the successful receptions by advancing a read pointer in the retry buffer;

receiving a retry request when the transmitted packets are not successfully received by the receiving agent;

relocating the playback pointer to a current location of the read pointer in response to the retry request; and initiating a retry operation in response to the retry request by sequentially retransmitting packets written in the retry buffer to the receiving agent beginning at the relocated playback pointer, and tracking the retransmitting of the packets by advancing the playback pointer, wherein packets of the packet stream continue to be written in the retry buffer in real-time and tracked by the write pointer during the retry operation.

16. The method of claim 15, further comprising:

setting a playback pointer snapshot at the playback pointer indicating a current playback location in the retry buffer in response to the retry request; and setting a read pointer snapshot at the read pointer indicating a current read location in the retry buffer in response to the retry request.

17. A transmitting agent for transmitting packets to a receiving agent via a bus, the transmitting agent comprising:

a transaction layer configured to issue packets to be transmitted to the receiving agent; and a retry buffer configured to:

sequentially receive and store the packets from a transaction layer of the transmitting agent in real-time;

sequentially transmit the stored packets to the receiving agent via a forward link of the bus, wherein stored packets not yet transmitted are buffered packets;

receive acknowledgements from the receiving agent when the receiving agent has successfully received the transmitted packets wherein transmitted packets for which acknowledgements have not yet been received are pending packets;

sequentially retransmit the pending packets to the receiving agent, beginning with a transmitted packet not successfully received by the receiving agent; and continue to sequentially receive and store the packets from the transaction layer of the transmitting agent in real-time while sequentially retransmitting the pending packets.

18. The transmitting agent of claim 17, wherein the transmitting agent comprises a host device and the receiving agent comprises a memory device.

19. The transmitting agent of claim 17, wherein the retry buffer comprises:

a write pointer set to indicate a write location in which a packet most recently received from the transaction layer is stored;

a playback pointer to indicate a playback location from which a stored packet has been most recently transmitted; and a read pointer set to indicate a read location of a previously transmitted packet for which an acknowledgement has been received.

20. The transmitting agent of claim 19, wherein the retry buffer comprises a plurality of contexts, wherein each of the write pointer, the playback pointer and the read pointer are able to advance between adjacent contexts.

* * * * *